US012786408B2

(12) United States Patent
Chen et al.

(10) Patent No.: US 12,786,408 B2
(45) Date of Patent: Nov. 3, 2026

(54) FILTERED CROSS-COMPONENT PREDICTION

(71) Applicant: Tencent America LLC, Palo Alto, CA (US)

(72) Inventors: Lien-Fei Chen, Hsinchu (TW); Roman Chernyak, Palo Alto, CA (US); Xiaozhong Xu, State College, PA (US); Xin Zhao, San Jose, CA (US); Shan Liu, San Jose, CA (US)

(73) Assignee: Tencent America LLC, Palo Alto, CA (US)

(*) Notice: Subject to any disclaimer, the term of this patent is extended or adjusted under 35 U.S.C. 154(b) by 248 days.

(21) Appl. No.: 18/406,323

(22) Filed: Jan. 8, 2024

(65) Prior Publication Data

US 2024/0236326 A1 Jul. 11, 2024

Related U.S. Application Data

(60) Provisional application No. 63/437,988, filed on Jan. 9, 2023.

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/176* (2014.11); *H04N 19/186* (2014.11)

(58) Field of Classification Search
CPC .... H04N 19/117; H04N 19/186; H04N 19/82; H04N 19/176; H04N 19/70; H04N 19/105
See application file for complete search history.

(56) References Cited

U.S. PATENT DOCUMENTS 9,300,984 B1 * 3/2016 Ostiguy ............... H04N 19/463
9,906,798 B2 * 2/2018 Narroschke .......... H04N 19/176
(Continued)

OTHER PUBLICATIONS

M. Coban, et. al., "Algorithm description of Enhanced Compression Model 5 (ECM5)", ISO/IEC JTC1/SC29/WG5 JVET-Z2025, Apr. 2022, pp. 1-45.
(Continued)

*Primary Examiner* — Daniel Chang
(74) *Attorney, Agent, or Firm* — ArentFox Schiff LLP

(57) ABSTRACT

Processing circuitry determines a use of at least two prediction models on different samples in a current block. The processing circuitry generates predicted values of first samples in the current block according to a first prediction model and generates predicted values of second samples in the current block according to a second prediction model that is different from the first prediction model. The processing circuitry determines whether to apply a filter on a current sample in the current block based on whether one or more adjacent neighboring samples use a different prediction model from the current sample. Then, in response to a determination of applying the filter, the processing circuitry reconstructs the current sample based on a filtering output from the filter with predicted values of the current sample and the one or more adjacent neighboring samples being inputs of the filter.

20 Claims, 10 Drawing Sheets

(51) Int. Cl.
*H04N 19/176* (2014.01)
*H04N 19/186* (2014.01)

(56) References Cited

U.S. PATENT DOCUMENTS

| | | | | |
|---|---|---|---|---|
| 10,785,503 | B2 * | 9/2020 | Jeong | H04N 19/45 |
| 2011/0090967 | A1 * | 4/2011 | Chen | H04N 19/129<br>375/E7.125 |
| 2018/0199034 | A1 * | 7/2018 | Nam | H04N 19/82 |
| 2019/0364295 | A1 | 11/2019 | Li et al. | |
| 2020/0404253 | A1 * | 12/2020 | Chen | B23P 15/00 |
| 2021/0021841 | A1 * | 1/2021 | Xu | H04N 19/157 |
| 2021/0218958 | A1 * | 7/2021 | Huo | H04N 19/105 |
| 2022/0078488 | A1 | 3/2022 | Leleannec et al. | |
| 2022/0159290 | A1 * | 5/2022 | Bordes | H04N 19/105 |

OTHER PUBLICATIONS

High Efficiency Video Coding, Rec. ITU-T H.265 v4 Dec. 2016, pp. 1-664.

ITU-T and ISO/IEC, “Versatile Video Coding”, ITU-T Rec. H.266 and ISO/IEC 23090-3, 2020, pp. 1-516.

A. Browne, Y. Ye, and S. H. Kim, “Algorithm description for Versatile Video Coding and Test Model 17 (VTM17)”, ISO/IEC JTC1/SC29/WG5 JVET-Z2002, Apr. 2022, pp. 1-130.

International Search Report and Written Opinion received for PCT Patent Application No. PCT/US2024/010835, mailed on Apr. 22, 2024, 10 pages.

* cited by examiner

FILTERED CROSS-COMPONENT PREDICTION

INCORPORATION BY REFERENCE

The present application claims the benefit of priority to U.S. Provisional Application No. 63/437,988, "FILTERED CROSS-COMPONENT PREDICTION" filed on Jan. 9, 2023, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video decoding includes processing circuitry. The processing circuitry receives a coded video bitstream including coded information of a current block in a current picture. The coded information indicates a use of at least two prediction models on different samples in the current block. The processing circuitry generates predicted values of first samples in the current block according to a first prediction model and generates predicted values of second samples in the current block according to a second prediction model that is different from the first prediction model. The processing circuitry determines whether to apply a filter on a current sample in the current block based on whether one or more adjacent neighboring samples of the current sample use a different prediction model from the current sample. Then, in response to a determination of applying the filter, the processing circuitry reconstructs the current sample based on a filtering output from the filter with predicted values of the current sample and the one or more adjacent neighboring samples being inputs of the filter.

In some examples, the coded information indicates a use of multi-model cross component prediction that predicts a second color component based on a first color component. The processing circuitry generates, for a first sample in the first samples, a first predicted value of the second color component based on a first reconstructed value of the first color component according to the first prediction model, and generates, for a second sample in the second samples, a second predicted value of the second color component based on a second reconstructed value of the first color component according to the second prediction model.

In some examples, the coded information indicates a use of a plurality of local illumination compensation (LIC) models, and the processing circuitry apples a first LIC model on a first class of samples to generate the predicted values of the first samples, and applies a second LIC model on a second class of samples to generate the predicted values of the second samples.

In some examples, each of the at least two prediction models is a linear model that defines a linear combination of a plurality of terms.

In some examples, the filter comprises at least a first term of the current sample and at least a second term of an adjacent neighboring sample.

In some examples, the processing circuitry determines to apply the filter when an adjacent neighboring sample of the current sample uses a different prediction model from the current sample.

In some examples, the processing circuitry determines to apply the filter when each adjacent neighboring sample of the current sample use a different prediction model from the current sample.

In some examples, the one or more adjacent neighboring samples of the current sample are in the current block.

In some examples, the processing circuitry decodes a flag that indicates whether to apply the filter in the current block in response to the coded information indicating the use of at least two prediction models in the current block.

In some examples, the processing circuitry determines whether to apply the filter in the current block based on a ratio of sample numbers for different prediction models. In an example, the processing circuitry calculates the ratio as a first sample number of the first samples to a second sample number of the second samples. In another example, the processing circuitry calculates the ratio as a sample number for one of the first prediction model and the second prediction model to a total number of samples in the current block.

In some examples, the processing circuitry determines whether the ratio satisfies a requirement based on a comparison of the ratio to a threshold, and determines to apply the filter in the current block in response to the ratio satisfying the requirement. The ratio is defined as at least one of a constant value or an inverse of the constant value. In an example, the constant value is predefined. In another example, the constant value is determined from a high level syntax.

Aspects of the disclosure also provide a non-transitory computer-readable medium storing instructions which, when executed by a computer, cause the computer to perform the method for video decoding/encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
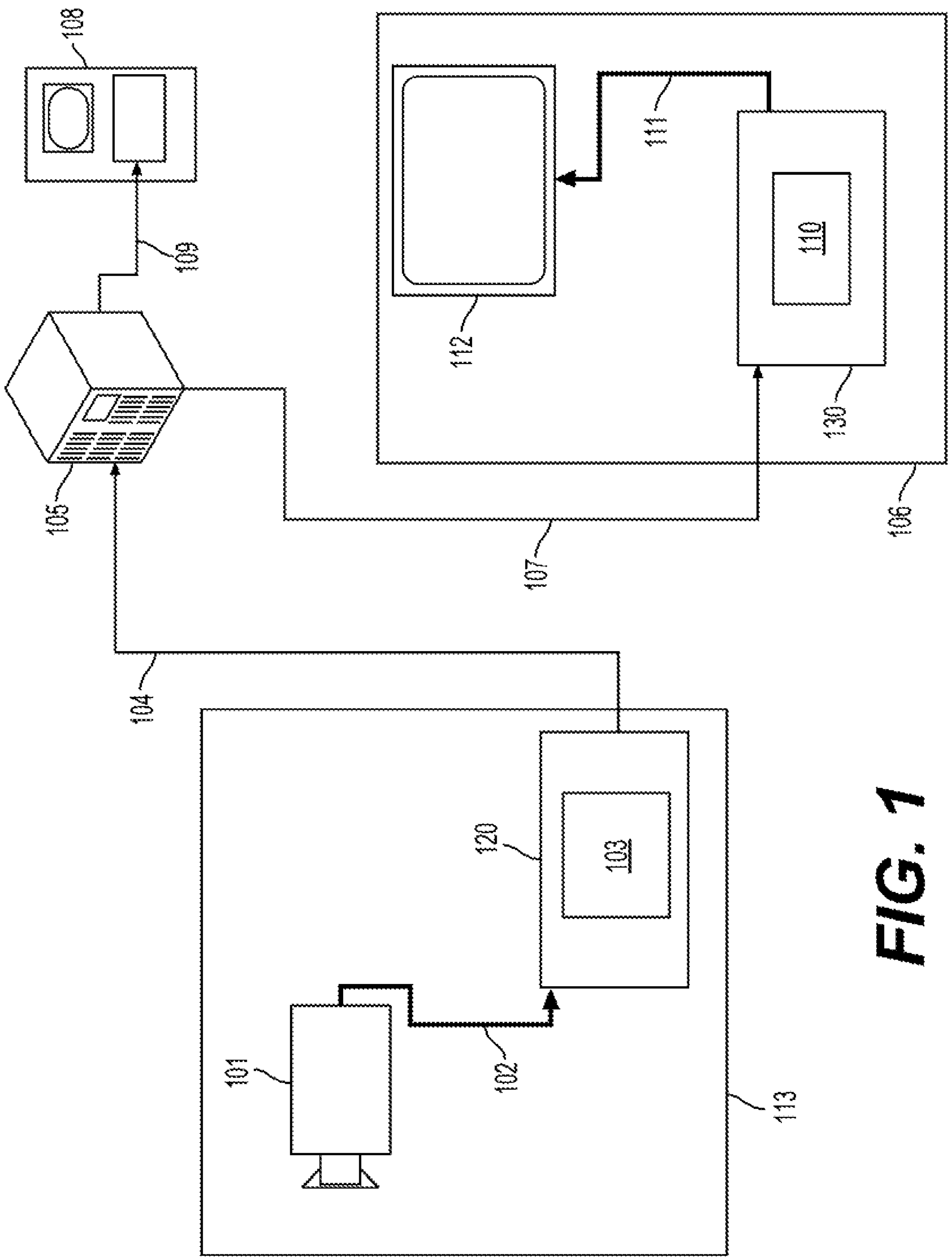
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
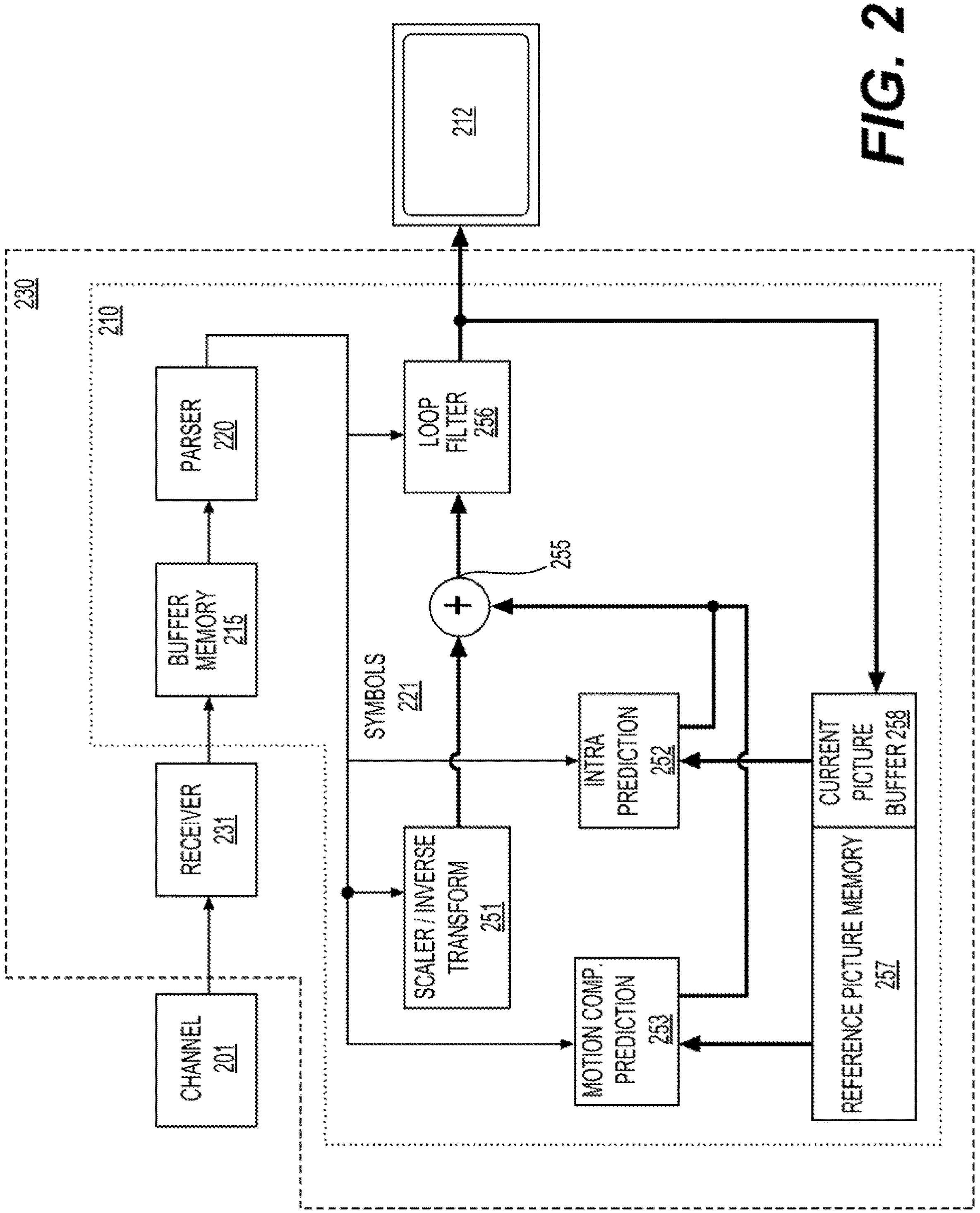
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
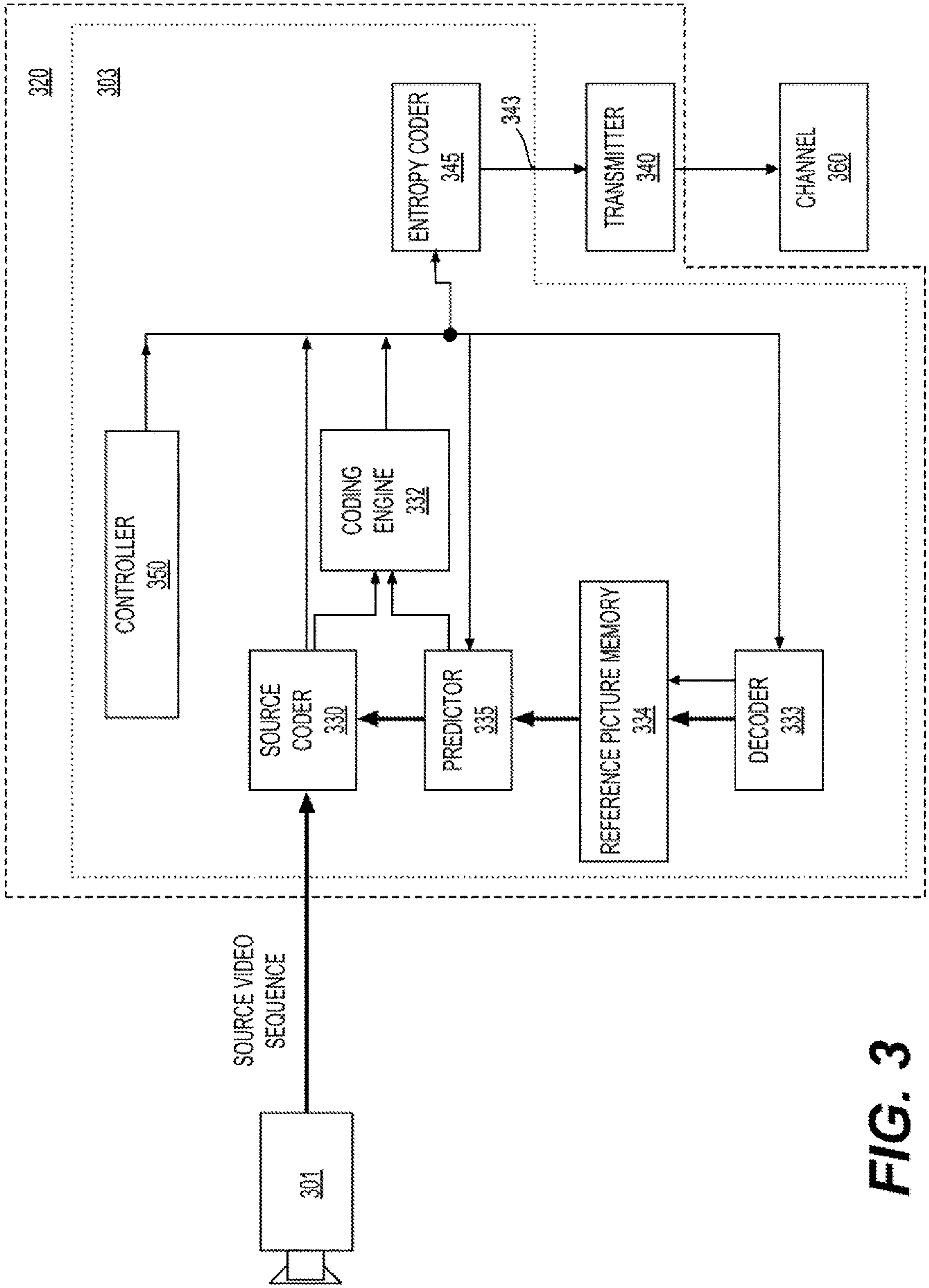
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

Some aspects of the disclosure provide techniques for smoothing predictions in a block, such as filtered cross-component prediction, and the like.

In some examples, the cross-component prediction can include a first technique referred to as cross component linear model (CCLM), a second technique referred to as multi-model linear model (MMLM), a third technique referred to as convolutional cross-component model (CCCM), and a fourth technique referred to as gradient linear model (GLM).

In some examples (e.g., VVC), the first technique CCLM is used to reduce the cross-component redundancy. In the CCLM, the chroma samples are predicted based on the reconstructed luma samples of the same CU by using a linear model, such as using Eq. (1):

$$pred_C(i, j) = a \cdot rec_L'(i, j) + b \quad \text{Eq. (1)}$$

where $pred_C$(i,j) represents the predicted chroma samples in a CU and $rec_L$'(i,j) represents the downsampled reconstructed luma samples of the same CU. The CCLM linear model includes parameters (a and b) that can be derived, in an example, with at most four neighbouring chroma samples and their corresponding down-sampled luma samples.

In some examples, based on the location of the neighboring chroma samples, CCLM can include different modes that is referred to as LM_T (LM top mode or above mode LM_A), LM_L (LM left mode) and LM_LT (LM left top mode or left above mode LM_LA or just LM mode). For example, the dimensions of the current chroma block are W×H, then W' and H' can be set for various modes in CCLM. When LM mode (also referred to as LM_LT or LM_LA) is applied, W'=W, H'=H; when LM-A mode is applied. W'=W+H; when LM-L mode is applied. H'=H+W.

The above neighbouring positions are denoted as S[0, −1] . . . S[W'−1, −1] and the left neighbouring positions are denoted as S[−1, 0] . . . S[−1, H'−1]. Then, four positions are selected. For example, when LM mode is applied and both above and left neighbouring samples are available, the four positions can include S[W'/4, −1], S[3*W'/4, −1]. S[−1, H'/4] and S[−1, 3*H'/4]; when LM_A mode is applied or only the above neighbouring samples are available, the four positions can include S[W'/8, −1], S[3*W/8, −1]. S[5*W'/8, −1] and S[7*W'/8, −1]; when LM-L mode is applied or only the left neighbouring samples are available, the four positions can include S[−1, H'/8], S[−1, 3*H'/8], S[−1, 5*H'/8] and S[−1, 7*H'/8].

The four neighbouring luma samples at the selected positions are down-sampled and compared to find two larger values denoted by $x^0_A$ and $x^1_A$, and two smaller values denoted by $x^0_B$ and $x^1_B$. The corresponding chroma sample values are denoted as $y^0_A$, $y^1_A$, $y^0_B$ and $y^1_B$. Then, intermediate parameters $X_a$, $X_b$, $Y_a$ and $Y_b$ are derived as Eq. (2):

$$X_a = (x_A^0 + x_A^1 + 1) \gg 1;\ X_b = (x_B^0 + x_B^1 + 1) \gg 1; \quad \text{Eq. (2)}$$
$$Y_a = (y_A^0 + y_A^1 + 1) \gg 1;\ Y_b = (y_B^0 + y_B^1 + 1) \gg 1$$

Finally, the linear model parameters a and b are obtained according to Eq. (3) and Eq. (4):

$$a = \frac{Y_a - Y_b}{X_a - X_b} \quad \text{Eq. (3)}$$

$$b = Y_b - a \cdot X_b \quad \text{Eq. (4)}$$

Figure 4:
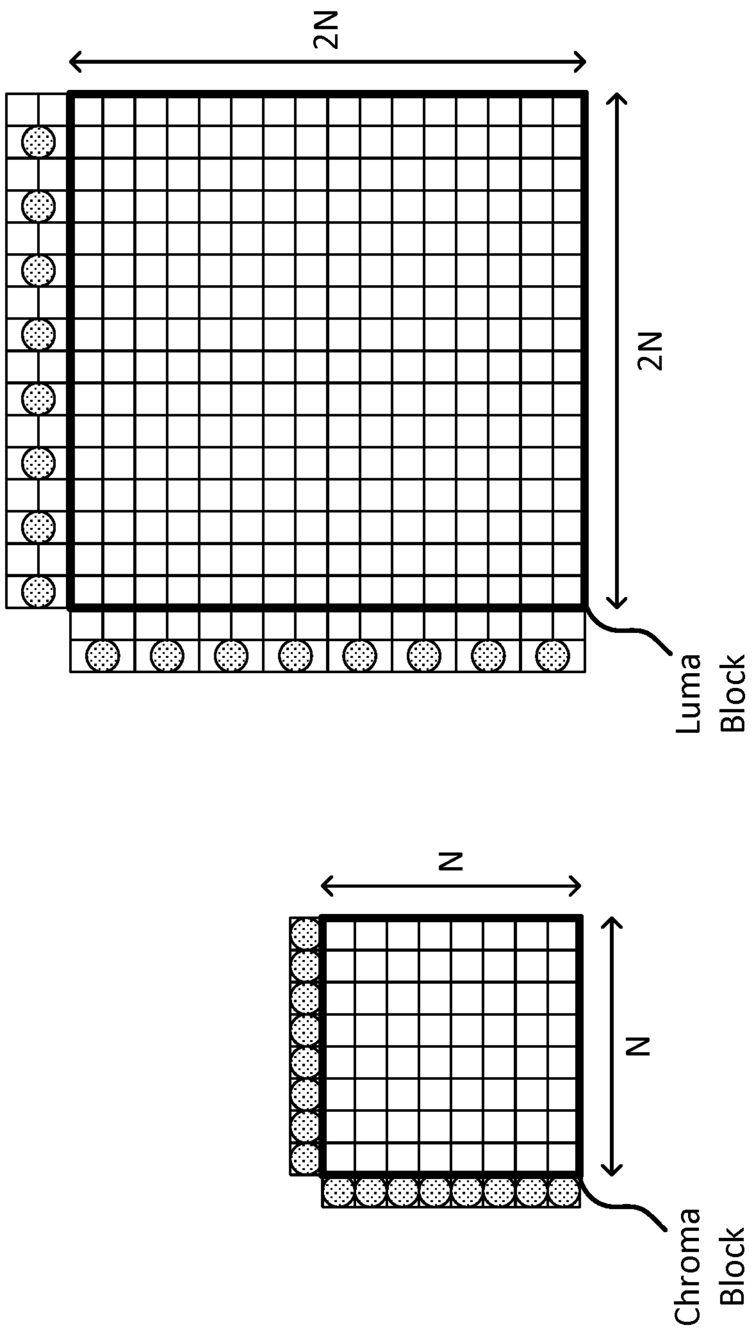
FIG. 4 shows a diagram of neighboring sample locations for parameter calculation in some examples.

FIG. 4 shows a diagram of neighboring sample locations for parameter calculation for CCLM in some examples. Referring to FIG. 4, neighboring sample pairs (luma samples and chroma samples) to derive parameters for the CCLM prediction are shown in shaded circles. In the FIG. 4 example, the current luma block size is 2N by 2N, and the current chroma block size is N by N. The neighboring samples pair can include 2N reference sample pair, such as 2N reference samples adjacent to the current chroma block and 2N reference samples adjacent to the current luma block. According to an aspect of the disclosure, the neighboring sample locations in FIG. 4 can be used when LM mode (also referred to as LM_LT or LM_LA) is applied.

In some examples, the division operation to calculate parameter a is implemented with a look-up table. To reduce the memory required for storing the look-up table, diff value (difference between maximum and minimum values) and the parameter a are expressed by an exponential notation. For example, diff is approximated with a 4-bit significant part and an exponent. Consequently, the look-up table for 1/diff can be reduced into 16 elements for 16 values of the significand as Eq. (5). Using the above techniques would have a benefit of both reducing the complexity of the calculation as well as the memory size required for storing the needed look-up tables.

$$Div\text{Table } [\ ] = \{0, 7, 6, 5, 5, 4, 4, 3, 3, 2, 2, 1, 1, 1, 1, 0\} \quad \text{Eq. (5)}$$

In some examples, in LM_T (also referred to as LM_A) mode, the above template is used to calculate the parameters of the linear model. To get more samples, the above template is extended to (W'=W+H) samples. In some examples, in LM_L mode, left template is used to calculate the parameters of the linear model. To get more samples, the left template is extended to (H'=H+W) samples.

In some examples, in LM_LT mode, left and above templates are used to calculate the parameters of the linear model. In an example, to match the chroma sample locations for 4:2:0 video sequences, two types of down-sampling filter are applied to luma samples to achieve 2 to 1 down-sampling ratio in both horizontal and vertical directions. The selection of down-sampling filter can be specified by a SPS level flag. The two downsmapling filters can be represented by Eq. (6) and Eq. (7) which are corresponding to “type-0” and “type-2” content, respectively.

$$rec_L'(i, j) = \left[\begin{matrix} rec_L(2i-1, 2j-1) + 2 \cdot rec_L(2i-1, 2j-1) + rec_L(2i+1, 2j-1) + \\ rec_L(2i+1, 2j) + 2 \cdot rec_L(2i, 2j) + rec_L(2i+1, 2j) + 4 \end{matrix}\right] \gg 3 \quad \text{Eq. (6)}$$

$$rec_L'(i, j) = \left[\begin{matrix} rec_L(2i, 2j-1) + rec_L(2i-1, 2j) + 4 \cdot rec_L(2i, 2j) + \\ rec_L(2i+1, 2j) + rec_L(2i, 2j+1) + 4 \end{matrix}\right] \gg 3 \quad \text{Eq. (7)}$$

It is noted that, in some examples, only one luma line (e.g., general line buffer in intra prediction) is used to provide the downsampled luma samples when the upper reference line is at the CTU boundary.

In some examples, the parameter computation is performed as part of the decoding process, and is not just as an encoder search operation. As a result, no syntax is used to convey the parameters (a and b) values to the decoder.

In some examples, for chroma intra mode coding, a total of 8 intra modes are allowed for chroma intra mode coding. Those modes include five traditional intra modes and three cross-component linear model modes (e.g., CCLM (LM), LM_A, and LM_L).

Table 1 shows information for chroma mode signalling and derivation process. In some examples, chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 1

Derivation of chroma prediction mode from luma mode when cclm is enabled

| | Corresponding luma intra prediction mode | | | | |
|---|---|---|---|---|---|
| Chroma prediction mode | 0 | 50 | 18 | 1 | X(0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

In some examples, a single binarization table is used regardless of the value of sps_cclm_enabled_flag, such as shown by Table 2.

TABLE 2

Unified binarization table for chroma prediction mode

| Value of intra_chroma_pred_mode | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

In Table 2, the first bin can indicate whether it is regular (0) or LM modes (1). If it is LM mode, then the next bin indicates whether it is LM_CHROMA (0) or not. If it is not LM_CHROMA, next 1 bin indicates whether it is LM_L (0) or LM_A (1). In some examples, when sps_cclm_enabled_flag is 0, the first bin of the binarization table for the corresponding intra_chroma_pred_mode can be discarded prior to the entropy coding. In other words, the first bin is inferred to be 0 and hence not coded. This single binarization table is used for both sps_cclm_enabled_flag equal to 0 and 1 cases. The first two bins in Table 2 are context coded with its own context model, and the rest bins are bypass coded.

In some examples, in order to reduce luma-chroma latency in dual tree, when the 64×64 luma coding tree node is partitioned with Not Split (and ISP is not used for the 64×64 CU) or QT, the chroma CUs in 32×32/32×16 chroma coding tree node are allowed to use CCLM. For example, if the 32×32 chroma node is not split or partitioned QT split, all chroma CUs in the 32×32 node can use CCLM; if the 32×32 chroma node is partitioned with Horizontal BT, and the 32×16 child node does not split or uses Vertical BT split, all chroma CUs in the 32×16 chroma node can use CCLM. In all the other luma and chroma coding tree split conditions, CCLM is not allowed for chroma CU.

In some examples, CCLM is extended by using the second technique multi-model LM (MMLM). In the MMLM mode, a threshold is calculated as an average of the luma reconstructed neighboring samples. Then, the reconstructed neighboring samples are classified into two classes using the threshold, such as a first class of reconstructed neighboring samples that are larger than the threshold, and a second class of reconstructed neighboring samples that are smaller than the threshold. The linear model of each class is respectively derived using the least-mean-square (LMS) method in an example. In some examples, a slope adjustment can be applied to CCLM and MMLM. The slope adjustment can tilt the linear function which maps luma values to chroma values with respect to a center point determined by the average luma value of the reference samples in the neighboring samples.

In some examples, slope adjustment is applied on CCLM. For example, CCLM uses a model, such as the linear model in Eq. 1 with 2 parameters to map luma values to chroma values. The parameter a is referred to as the slope parameter and the parameter b is referred to as the bias parameter.

In an example, a slope adjustment parameter "u" to the slope parameter is signaled to update the model to Eq. (8):

$$pred_C(i, j) = a' \cdot rec'_L(i, j) + b' \qquad \text{Eq. (8)}$$

Where a'=a'+u and b'=b−u×$y_r$. With this selection the mapping function is tilted or rotated around the point with luminance value $y_r$. The average of the reference luma samples used in the model creation as $y_r$ in order to provide a meaningful modification to the model.

Figure 5:
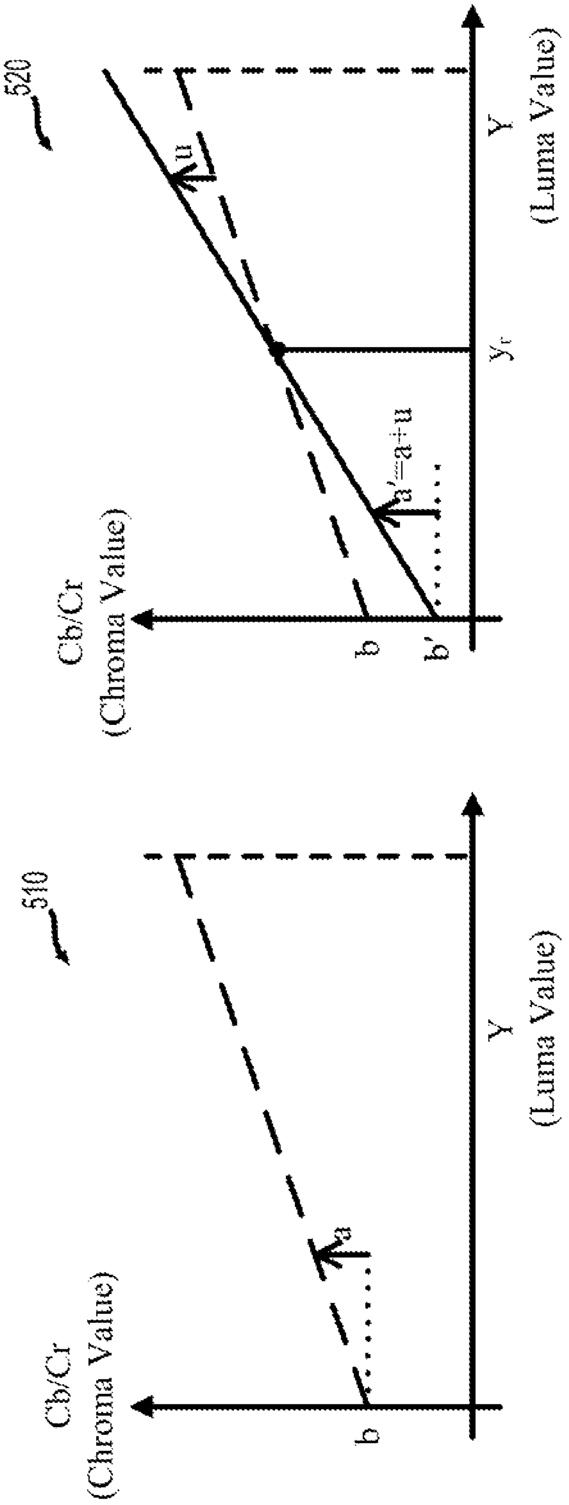
FIG. 5 shows a diagram illustrating the effect of the slope adjustment parameter in some examples.

FIG. 5 shows a diagram illustrating the effect of the slope adjustment parameter in some examples. FIG. 5 includes a first model (510) and a second model (520). The first model (510) is generated according to the CCLM without slope adjustment, and the second model (520) is generated according to the CCLM with slope adjustment.

In some implementation examples, the slope adjustment parameter u is provided as an integer between −4 and 4, inclusive, and signaled in the bitstream. The unit of the slope adjustment parameter u is $\frac{1}{8}^{th}$ of a chroma sample value per one luma sample value (for 10-bit content).

In some examples, the slope adjustment is available for the CCLM models that use reference samples both above and left of the block ("LM_CHROMA_IDX" and "MMLM_CHROMA_IDX"), but not for the "single side" modes. This selection is based on coding efficiency vs. complexity trade-off considerations. For example, the slope adjustment is available for LM mode, but not available for LM_A or LM_L modes.

In some examples, when slope adjustment is applied for a multimode CCLM model, both models can be adjusted and thus up to two slope updates are signaled for a single chroma block. For example, in the multimode CCLM (e.g., MMLM), two linear models are derived for the two classes. Two slope adjustment parameters can be signaled, and respectively applied on the two linear models to generate the updated models for use in the MMLM.

In some examples, at the encoder side, the encoder can perform a sum of absolute transform differences (SATD) based search for a first best value of the slope adjustment parameter for Cr and a similar SATD based search for a second best value of the slope adjustment parameter for Cb. When either one results as a non-zero slope adjustment parameter, the combined slope adjustment pair (the first best value, the second best value) is included in the list of RD checks for the TU.

In some examples, the third technique that is referred to as convolutional cross-component model (CCCM) can be used to predict chroma samples from reconstructed luma samples, such as in a similar spirit as the CCLM modes in ECM-6.0. In the CCCM, similar to CCLM, the reconstructed luma samples are down-sampled to match the lower resolution chroma grid when chroma sub-sampling is used. Similar to CCLM, top, left or top and left reference samples can be used as templates for model derivation. In an example, top reference samples can be used as templates for model derivation. In another example, left reference samples can be used as templates for model derivation. In another example, top and left reference samples can be used as templates for model derivation.

Also, similarly to CCLM, there is an option of using a single model or multi-model variant of CCCM. In an example, the multi-model variant uses two models, one model derived for samples above the average luma reference value and another model for the rest of the samples (following the spirit of the CCLM design). In some examples, the multi-model CCCM mode can be selected for PUs which have at least 128 reference samples available.

In the CCCM, convolutional filter is used. In some examples, the convolution filter is a 7-tap convolution filter. The convolutional 7-tap filter can include a first term of 5-tap plus sign shape spatial component (also referred to as spatial 5-tap component, the spatial 5-tap component can have a cross shape, also referred to as plus sign shape), a second term of a nonlinear term P and a third term of a bias term.

Figure 6:
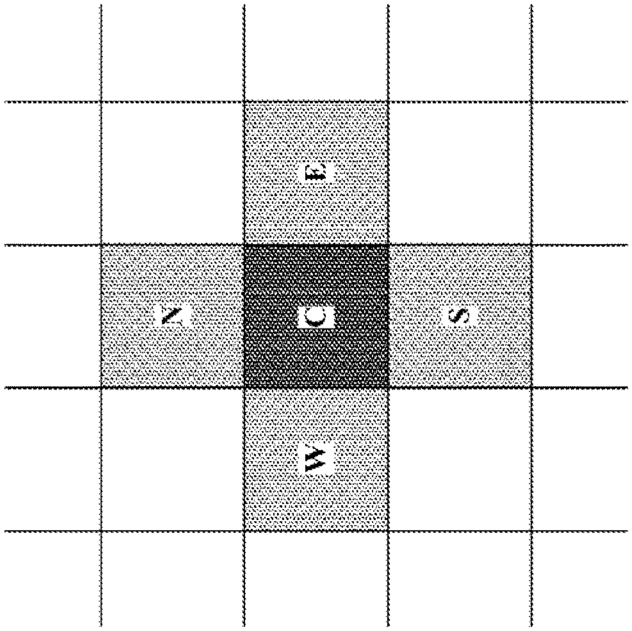
FIG. 6 shows locations of luma sample locations that are inputs to the spatial 5-tap component in an example.

FIG. 6 shows locations of luma sample locations that are inputs to the spatial 5-tap component in an example. The inputs to the spatial 5-tap component of the convolutional 7-tap filter includes a center (C) luma sample which is collocated with the chroma sample to be predicted and above/north (N), below/south (S), left/west (W) and right/east (E) neighbors.

In some examples, the nonlinear term P is represented as power of two of the center luma sample C and scaled to the sample value range of the content, such as according to Eq. (9)

$$P = (C \times C + midVal) \gg \text{bit Depth} \quad \text{Eq. (9)}$$

In an example, for 10-bit content, the nonlinear term P is calculated according to Eq. (10)

$$P = (C \times C + 512) \gg 10 \quad \text{Eq. (10)}$$

In some examples, the bias term B represents a scalar offset between the input and output (similarly to the offset term in CCLM) and is set to middle chroma value (512 for 10-bit content) in an example.

In some examples, the output of the convolutional 7-tap filter is calculated as a convolution between the filter coefficients $c_i$ and the input values and clipped to the range of valid chroma samples, such as according to Eq. (11)

$$predChromaVal = c_0C + c_1N + c_2S + c_3E + c_4W + c_5P + c_6B \quad \text{Eq. (11)}$$

In some examples, the filter coefficients $c_i$ can be determined (calculated) by minimizing mean squared error (MSE) between predicted and reconstructed chroma samples in a reference area.

Figure 7:
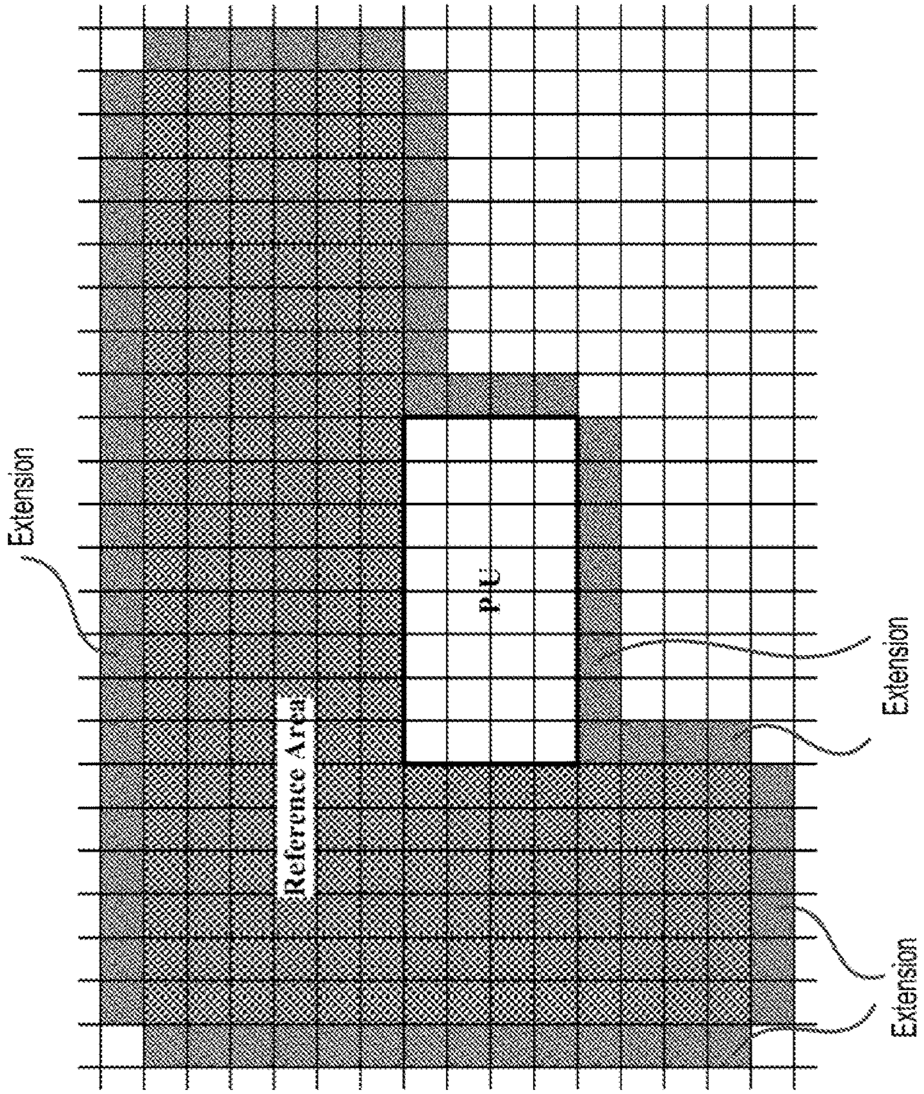
FIG. 7 shows a diagram illustrating a reference area that includes lines of chroma samples above and left of a prediction unit.

FIG. 7 shows a diagram illustrating a reference area that includes 6 lines of chroma samples above and left of a PU. The reference area extends one PU width to the right and one PU height below the PU boundaries. In some examples, the reference area is adjusted to include only available samples. In some examples, the extensions to the reference area are used to support the "side samples" of the plus shaped spatial filter and are padded when in unavailable areas.

In some examples, the MSE minimization is performed by calculating autocorrelation matrix for the luma input and a cross-correlation vector between the luma input and chroma output. Autocorrelation matrix is LDL decomposed and the final filter coefficients are calculated using back-substitution. In an example, the MSE minimization process for the filter coefficients is roughly similar to the calculation of the ALF filter coefficients in ECM, however LDL decomposition is used in the MSE minimization process for the filter coefficients instead of Cholesky decomposition to avoid using square root operations.

In some examples, the autocorrelation matrix is calculated using the reconstructed values of luma and chroma samples. In an example, these samples are full range (e.g. between 0 and 1023 for 10-bit content) resulting in relatively large values in the autocorrelation matrix. This requires high bit depth operation during the model parameters calculation. In some examples, removing fixed offsets from luma and chroma samples in each PU can be used for each model. This can drive down the magnitudes of the values used in the model creation and allow reducing the precision needed for the fixed-point arithmetic. As a result, 16-bit decimal precision can be used instead of the 22-bit precision of the original CCCM implementation.

In some examples, reference sample values just outside of the top-left corner of the PU are used as the offsets (offsetLuma, offsetCb and offsetCr) for simplicity. The samples values used in both model creation and final prediction (i.e., luma and chroma in the reference area, and luma in the current PU) are reduced by these fixed values. For example, the sample values can include C'=C−offsetLuma, N'=N−offsetLuma, S'=S−offsetLuma, E'=E−offsetLuma, W'=W−offsetLuma, P'=nonLinear (C'), and B=midValue=1<<(bitDepth−1), and the chroma value is predicted using Eq. (12), where offsetChroma is equal to offsetCr and offsetCb for Cr and Cb components, respectively:

$$predChromaVal = c0C' + c1N' + c2S' + c3E' + c4W' + c5P' + c6B + offsetChroma \quad \text{Eq. (12)}$$

In some examples, in order to avoid any additional sample level operations, the luma offset is removed during the luma reference sample interpolation. This can be done, for example, by substituting the rounding term used in the luma reference sample interpolation with an updated offset including both the rounding term and the offsetLuma. The chroma offset can be removed by deducting the chroma offset directly from the reference chroma samples. As an alternative way, impact of the chroma offset can be removed from the cross-component vector giving identical result. In order to add the chroma offset back to the output of the convolutional prediction operation the chroma offset is added to the bias term of the convolutional model.

In some examples, the process of CCCM model parameter calculation requires division operations. Division operations are not always considered implementation friendly. The division operation can be replaced with multiplication (with a scale factor) and shift operation, where scale factor and number of shifts are calculated based on denominator similar to the method used in calculation of CCLM parameters.

In some examples, the fourth technique gradient linear model (GLM) is used. In an example, for YUV 4:2:0 color format, a gradient linear model (GLM) method can be used to predict the chroma samples from luma sample gradients. Two modes are supported: a two-parameter GLM mode and a three-parameter GLM mode.

Compared with the CCLM, instead of down-sampled luma values, the two-parameter GLM utilizes luma sample gradients to derive the linear model. Specifically, when the two-parameter GLM is applied, the input to the CCLM process, i.e., the down-sampled luma samples L, are replaced by luma sample gradients G. The other parts of the CCLM (e.g., parameter derivation, prediction sample linear transform) are kept unchanged. In an example, a predicted C is calculated according to Eq. (13)

$$C = a \cdot G + b \quad \text{Eq. (13)}$$

In some examples, for the three-parameter GLM, a chroma sample can be predicted based on both the luma sample gradients and down-sampled luma values with different parameters. The model parameters of the three-parameter GLM are derived from 6 rows and columns adjacent samples by the LDL decomposition based MSE minimization method as used in the CCCM. In an example, a predicted C is calculated according to Eq. (14)

$$C = a_0 \cdot G + a_1 \cdot L + a_2 \cdot b \quad \text{Eq. (14)}$$

In some examples, for signaling, when the CCLM mode is enabled to the current CU, one flag is signaled to indicate whether GLM is enabled for both Cb and Cr components; if the GLM is enabled, another flag is signaled to indicate which of the two GLM modes is selected and one syntax element is further signaled to select one of 4 gradient filters for the gradient calculation.

Figure 8:
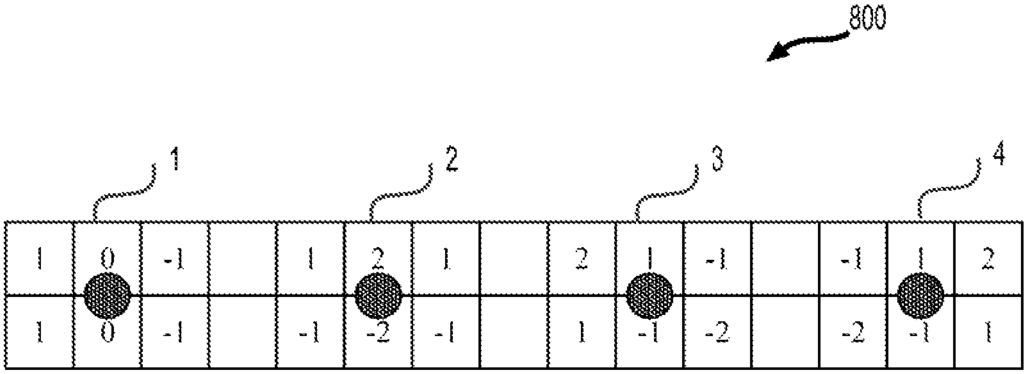
FIG. 8 shows a diagram of four Sobel based gradient filter patterns in some examples.

FIG. 8 shows a diagram (800) of four Sobel based gradient filter patterns (labeled as 1, 2, 3 and 4) that can be used for GLM.

In some examples, the usage of cross component prediction techniques can be signalled with a CABAC coded PU level flag in bitstream signalling. One new CABAC context can be included to support the signaling. In some examples, for signalling, CCCM is considered a sub-mode of CCLM. For example, a CCCM flag is only signalled if intra prediction mode is LM_CHROMA.

According to some aspects of the disclosure, multiple models or multiple modes can be used to generate samples in a same block. For example, for cross-component prediction, the second technique MMLM can be used to generate samples in the same block using two linear models. It is noted that the multi-model technique can be combined with other techniques. In an example, the muti-model technique is applied on CCLM, and the CCLM with the multi-model can be referred to as MM-CCLM. In another example, the multi-model technique is applied on CCCM, and the CCCM with the multi-model can be referred to as MM-CCCM. In the following description, the term multi-model (or multi-mode) cross-component prediction (MMCCP) is used to illustrate techniques of using multiple models (or multiple modes) to generate samples in the same block (e.g., same CU), MMCCP can include MMLM, MM-CCLM, MM-CCCM, and the like. It is noted that the techniques of using multiple models or multiple modes to generate samples in the same block can be applied to other suitable prediction techniques, such as local illumination compensation (LIC), and the like. It is also noted that the multiple models can be linear models or non linear models. In some examples, a model can be a linear combination of multiple terms, such as a weighed sum of multiple terms. In an example, the multiple terms can be linear terms. In another example, the multiple terms can include non linear terms.

In some examples, local illumination compensation (LIC) is used as an inter prediction technique to model local illumination variation between a current block and a prediction block (also referred to as reference block) of the current block by using a linear function. The prediction block is in a reference picture, and can be pointed by motion vector (MV). The parameters of the linear function can include a scale α and an offset β, and the linear function can be represented by $\alpha \times p[x, y] + \beta$ to compensate illumination changes, where p[x, y] denotes a reference sample at a location [x, y] in the reference block (also referred to as prediction block), the reference block is pointed to by MV. In some examples, the scale α and the offset β can be derived based on a template of the current block and a corresponding reference template of the reference block by using the least square method, thus no signaling overhead is required, except that an LIC flag may be signaled to indicate the use of LIC. In some embodiments, multiple models can be used for LIC (referred to as multi-model LIC). In some examples, samples can be classified into different classes, and different classes can use different models that are derived from the different classes of the template samples.

According to an aspect of the disclosure, when different linear models are used to generate cross-component prediction for the samples in the same block, for adjacent samples that use different linear models, the cross-component prediction of the samples in the block may be not smooth. Some aspects of the present disclosure provide techniques to generate smooth prediction of the samples in a block when different models are used on different samples in the block. For example, encoder/decoder can determine a use of at least two prediction models on different samples in a current block. The encoder/decoder can generate predicted values of first samples in the current block according to a first prediction model and generate predicted values of second samples in the current block according to a second prediction model that is different from the first prediction model. The encoder/decoder determines whether to apply a filter on a current sample in the current block based on whether one or more adjacent neighboring samples of the current sample use a different prediction model from the current sample. Then, in response to a determination of applying the filter, the encoder/decoder reconstructs the current sample based on a filtering output from the filter with predicted values of the current sample and the one or more adjacent neighboring samples being inputs of the filter.

Some aspects of the present disclosure provide techniques to generate smooth cross-component prediction of the samples in a block when different models are used to generate the cross-component prediction of the samples in the block. In the following description, the multi-model CCP (MMCCP) with smoothing is referred to as S-MMCCP.

According to an aspect of the disclosure, S-MMCCP can be an adaptive process that includes a first stage and a second stage, and may be referred to as adaptive S-MMCCP in some examples. In the first stage, MMCCP is used as a first filter of cross-component prediction for generating samples in a block, and in the second stage, a second filter can be adaptively applied to samples in the block to smooth the block. Whether to apply the (second) filter on a sample or not is decided based on the adjacent neighboring sample (s) during a generation (e.g., the second stage) of the final prediction of MMCCP for the sample. For example, in the first stage of adaptive S-MMCCP, the MMCCP is firstly applied to each sample. In the second stage of adaptive S-MMCCP, whether a second filter will be applied on each sample is determined by checking the linear model usage of the sample and its adjacent neighboring samples which are the input of the second filter after MMCCP process. It is noted that, in the present disclosure, neighboring samples of a current sample refer to samples that are in a neighborhood of the current sample, and are not necessarily immediately adjacent to the current sample, and adjacent neighboring samples of the current sample refer to the samples that are immediately adjacent to the current sample.

Figure 9:
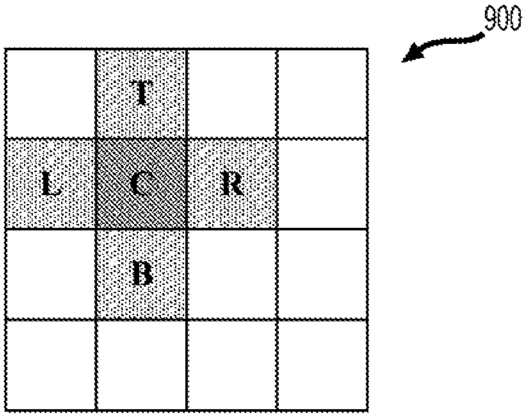
FIG. 9 shows a diagram of applying a second filter after multi-model cross component prediction in some examples.

FIG. 9 shows a diagram of applying a second filter after MMCCP in some examples. In FIG. 9, a current block (900) includes a plurality of samples, represented by small squares. In an example, in the first stage of adaptive S-MMCCP, the MMCCP is firstly applied to each sample of the current block (900). Then, in the second stage of adaptive S-MMCCP, whether to apply a second filter on a sample is determined by checking the linear model usage of the sample and adjacent neighboring samples which are the input of the second filter after MMCCP process.

In the FIG. 9 example, for a current sample shown by "C", the input to the second filter includes the current sample "C", and four neighboring samples that are shown as "T", "B", "L" and "R" in FIG. 9. Whether to apply the second filter on the current sample can be determined based on the linear model usage of the current sample "C", and the four neighboring samples "T", "B", "L" and "R". For example, when it is determined that the current sample "C" satisfies a smooth requirement (will be further described) with the neighboring samples after MMCCP process, then the second filter may not be needed; however, when it is determined that the current sample "C" does not satisfy the smooth requirement, then the second filter is applied on the current sample in the second stage to generate the final prediction of the current sample.

In an example, the second filter can generate a weighted average as a final prediction of the current sample based on the current sample and the adjacent neighboring samples. For example, the weights for the samples "C", "T", "B", "L" and "R" can be ½, ⅛, ⅛, ⅛ and ⅛ respectively in an example.

It is noted that, while a plus sign pattern is used as the filter pattern for the second filter in FIG. 9, other suitable filter pattern can be used for the second filter.

It is noted that the smooth requirement can be defined by various techniques. In some embodiments, the smooth requirement is defined based on whether different linear models are used during MMCCP process for the current sample and the adjacent neighboring sample(s). In an embodiment, the second filter is to be applied on the current sample when the current sample and at least one of its adjacent neighboring samples use different linear models during MMCCP process. In another embodiment, the second filter is to be applied on the current sample when the current sample and all of its adjacent neighboring samples use different linear models during MMCCP process. In some examples, only the neighboring samples located inside the current block with the current sample are used to determine whether the second filter is to be applied or not.

In some embodiments, a flag is used to indicate whether to use the adaptive S-MMCCP. In an embodiment, the flag is signaled to indicate the adaptive S-MMCCP is used or not when MMCCP is used. In another embodiment, the flag is signaled to indicate the adaptive S-MMCCP is used or not no matter whether MMCCP relative syntax is signaled or not. In another embodiment, the adaptive S-MMCCP is always applied when MMCCP is used, and the flag to indicate whether to use the adaptive S-MMCCP is not needed. In another embodiment, the flag to indicate whether to use the adaptive S-MMCCP is context coded using a context model that depends on whether the neighboring coded blocks are coded with the adaptive S-MMCCP.

According to another aspect of the disclosure, whether to apply the filter for MMCCP is determined based on the ratio of the sample number for different linear models. When the ratio is smaller than 1/T or larger than T, the filter is not applied for MMCCP, where T is a constant threshold value. In some examples, the value of T is a predefined value. In some examples, the value of T or an index indicative of T can be signal in high level syntax.

In some examples, two models, such as a first model and a second model are used in MMCCP process of a block, the sample number of the first model is much larger than the sample number of the second model, for example, a ratio of the sample numbers of the first model to the second model is larger than T (e.g., T is larger than 1), or a ratio of the sample numbers of the second model to the first model is smaller than 1/T, the second filter is not applied for MMCCP (e.g., S-MMCCP is not used).

In some examples, a ratio of the sample number of the first model (or the second model) to the total number of samples in the block is calculated. In an example, when the ratio is smaller than a first threshold, the second filter is not applied for MMCCP (e.g., S-MMCCP is not used). In another example, when the ratio is larger than a second threshold, the second filter is not applied for MMCCP (e.g., S-MMCCP is not used). The first threshold and/or the second threshold can be suitably defined. In an example, the first threshold is T and the second threshold is 1/T.

Figure 10:
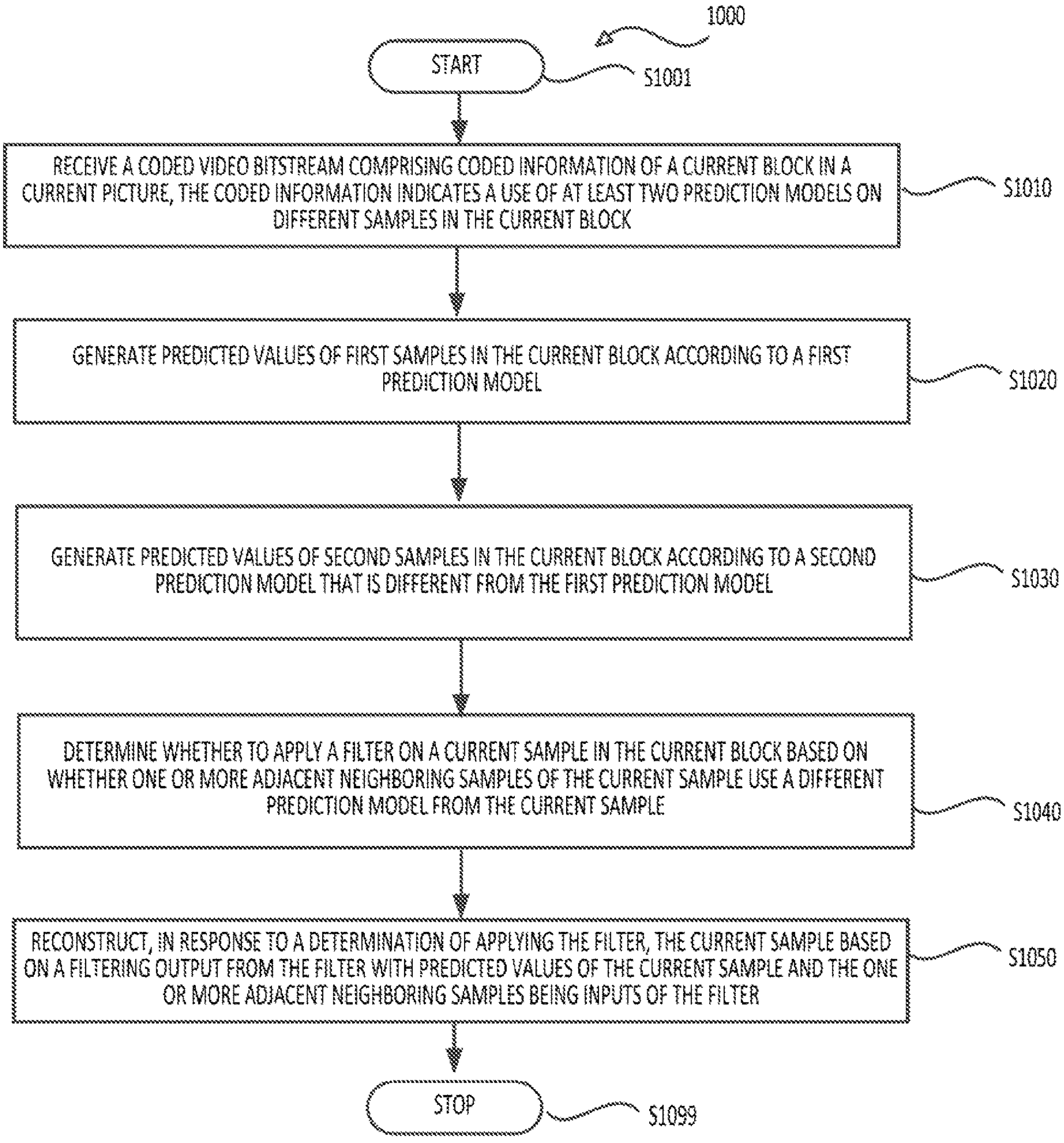
FIG. 10 shows a flow chart outlining another process according to some embodiment of the disclosure.

FIG. 10 shows a flow chart outlining a process (1000) according to an embodiment of the disclosure. The process (1000) can be used in a video decoder. In various embodiments, the process (1000) is executed by processing circuitry, such as the processing circuitry that performs functions of the video decoder (110), the processing circuitry that performs functions of the video decoder (210), and the like. In some embodiments, the process (1000) is implemented in software instructions, thus when the processing circuitry executes the software instructions, the processing circuitry performs the process (1000). The process starts at (S1001) and proceeds to (S1010).

At (S1010), a coded video bitstream including coded information of a current block in a current picture is received. The coded information indicates a use of at least two prediction models on different samples in the current block.

At (S1020), predicted values of first samples in the current block are generated according to a first prediction model.

At (S1030), predicted values of second samples in the current block are generated according to a second prediction model that is different from the first prediction model.

At (S1040), whether to apply a filter on a current sample in the current block is determined based on whether one or more adjacent neighboring samples of the current sample use a different prediction model from the current sample.

At (S1050), in response to a determination of applying the filter, the current sample is reconstructed based on a filtering output from the filter with predicted values of the current sample and the one or more adjacent neighboring samples being inputs of the filter.

In some examples, the coded information indicates a use of multi-model cross component prediction that predicts a second color component based on a first color component. Then, for a first sample in the first samples, a first predicted value of the second color component is generated based on a first reconstructed value of the first color component according to the first prediction model. For a second sample in the second samples, a second predicted value of the second color component is generated based on a second reconstructed value of the first color component according to the second prediction model.

In some examples, the coded information indicates a use of a plurality of local illumination compensation (LIC) models. Then, a first LIC model is applied on a first class of samples to generate the predicted values of the first samples, and a second LIC model is applied on a second class of samples to generate the predicted values of the second samples.

In some examples, each of the at least two prediction models is a linear model that defines a linear combination of a plurality of terms. In an example, the plurality of terms are linear terms. In another example, the plurality of terms includes one or more non linear terms.

In some examples, the filter includes at least a first term based on the current sample and at least a second term based on an adjacent neighboring sample.

In some examples, to apply the filter on the current sample is determined when an adjacent neighboring sample of the current sample uses a different prediction model from the current sample.

In some examples, to apply the filter on the current sample is determined when each adjacent neighboring sample of the current sample use a different prediction model from the current sample. The one or more adjacent neighboring samples of the current sample are in the current block.

In some examples, a flag that indicates whether to apply the filter in the current block is decoded from the coded video bitstream. In an example, the flag is decoded in response to the coded information indicating the use of at least two prediction models in the current block. In another example, the flag is decoded no matter whether a syntax related to the at least two prediction models is signaled or not. In another example, the filter is always applied when the at least two prediction models are used.

In some examples, whether to apply the filter in the current block is determined based on a ratio of sample numbers for different prediction models. In an example, the ratio is calculated as a first sample number of the first samples to a second sample number of the second samples. In another example, the ratio is calculated as a sample number for one of the first prediction model and the second prediction model to a total number of samples in the current block.

In some examples, whether the ratio satisfies a requirement is determined based on a comparison of the ratio to a threshold, and to apply the filter in the current block is determined in response to the ratio satisfying the requirement. The ratio is defined as at least one of a constant value or an inverse of the constant value. In an example, the constant value is predefined. In another example, the constant value is determined from a high level syntax.

Then, the process proceeds to (S1099) and terminates.

The process (1000) can be suitably adapted. Step(s) in the process (1000) can be modified and/or omitted. Additional step(s) can be added. Any suitable order of implementation can be used.

Figure 11:
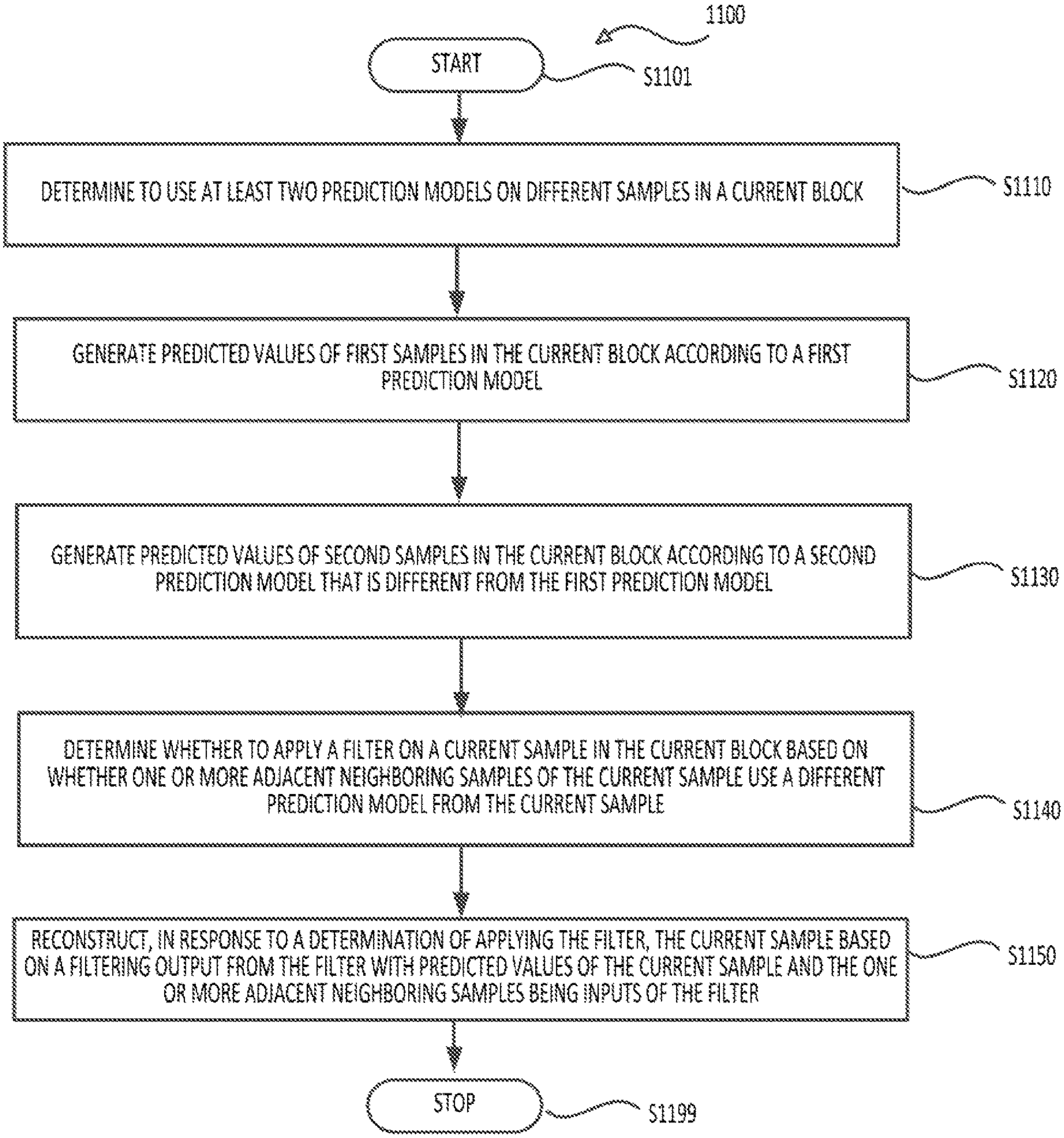
FIG. 11 shows a flow chart outlining a process according to some embodiment of the disclosure.

FIG. 11 shows a flow chart outlining a process (1100) according to an embodiment of the disclosure. The process (1100) can be used in a video encoder. In various embodiments, the process (1100) is executed by processing circuitry, such as the processing circuitry that performs functions of the video encoder (103), the processing circuitry that performs functions of the video encoder (303), and the like. In some embodiments, the process (1100) is implemented in software instructions, thus when the processing circuitry executes the software instructions, the processing circuitry performs the process (1100). The process starts at (S1101) and proceeds to (S1110).

At (S1110), to use at least two prediction models on different samples in a current block is determined.

At (S1120), predicted values of first samples in the current block are generated according to a first prediction model.

At (S1130), predicted values of second samples in the current block are generated according to a second prediction model that is different from the first prediction model.

At (S1140), whether to apply a filter on a current sample in the current block is determined based on whether one or more adjacent neighboring samples of the current sample use a different prediction model from the current sample.

At (S1150), in response to a determination of applying the filter, the current sample is reconstructed based on a filtering output from the filter with predicted values of the current sample and the one or more adjacent neighboring samples being inputs of the filter.

In some examples, a use of multi-model cross component prediction that predicts a second color component based on a first color component is determined. Then, for a first sample in the first samples, a first predicted value of the second color component is generated based on a first reconstructed value of the first color component according to the first prediction model. For a second sample in the second samples, a second predicted value of the second color component is generated based on a second reconstructed value of the first color component according to the second prediction model.

In some examples, a use of a plurality of local illumination compensation (LIC) models for the current block is determined. Then, a first LIC model is applied on a first class of samples to generate the predicted values of the first samples, and a second LIC model is applied on a second class of samples to generate the predicted values of the second samples.

In some examples, each of the at least two prediction models is a linear model that defines a linear combination of a plurality of terms. In an example, the plurality of terms are linear terms. In another example, the plurality of terms includes one or more non linear terms.

In some examples, the filter includes at least a first term based on the current sample and at least a second term based on an adjacent neighboring sample.

In some examples, to apply the filter on the current sample is determined when an adjacent neighboring sample of the current sample uses a different prediction model from the current sample.

In some examples, to apply the filter on the current sample is determined when each adjacent neighboring sample of the current sample use a different prediction model from the current sample. The one or more adjacent neighboring samples of the current sample are in the current block.

In some examples, a flag that indicates whether to apply the filter in the current block is encoded (signaled) in the coded video bitstream. In an example, the flag is signaled when at least two prediction models are used in the prediction of the current block. In another example, the flag is signaled no matter whether a syntax related to the at least two prediction models is signaled or not. In another example, the filter is always applied when the at least two prediction models are used in the prediction of the current block.

In some examples, whether to apply the filter in the current block is determined based on a ratio of sample numbers for different prediction models. In an example, the ratio is calculated as a first sample number of the first samples to a second sample number of the second samples. In another example, the ratio is calculated as a sample number for one of the first prediction model and the second prediction model to a total number of samples in the current block.

In some examples, whether the ratio satisfies a requirement is determined based on a comparison of the ratio to a threshold, and to apply the filter in the current block is determined in response to the ratio satisfying the requirement. The ratio is defined as at least one of a constant value or an inverse of the constant value. In an example, the constant value is predefined. In another example, the constant value is signaled in a high level syntax.

Then, the process proceeds to (S1199) and terminates.

The process (1100) can be suitably adapted. Step(s) in the process (1100) can be modified and/or omitted. Additional step(s) can be added. Any suitable order of implementation can be used.

The techniques described above, can be implemented as computer software using computer-readable instructions and physically stored in one or more computer-readable media. For example, FIG. 12 shows a computer system (1200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
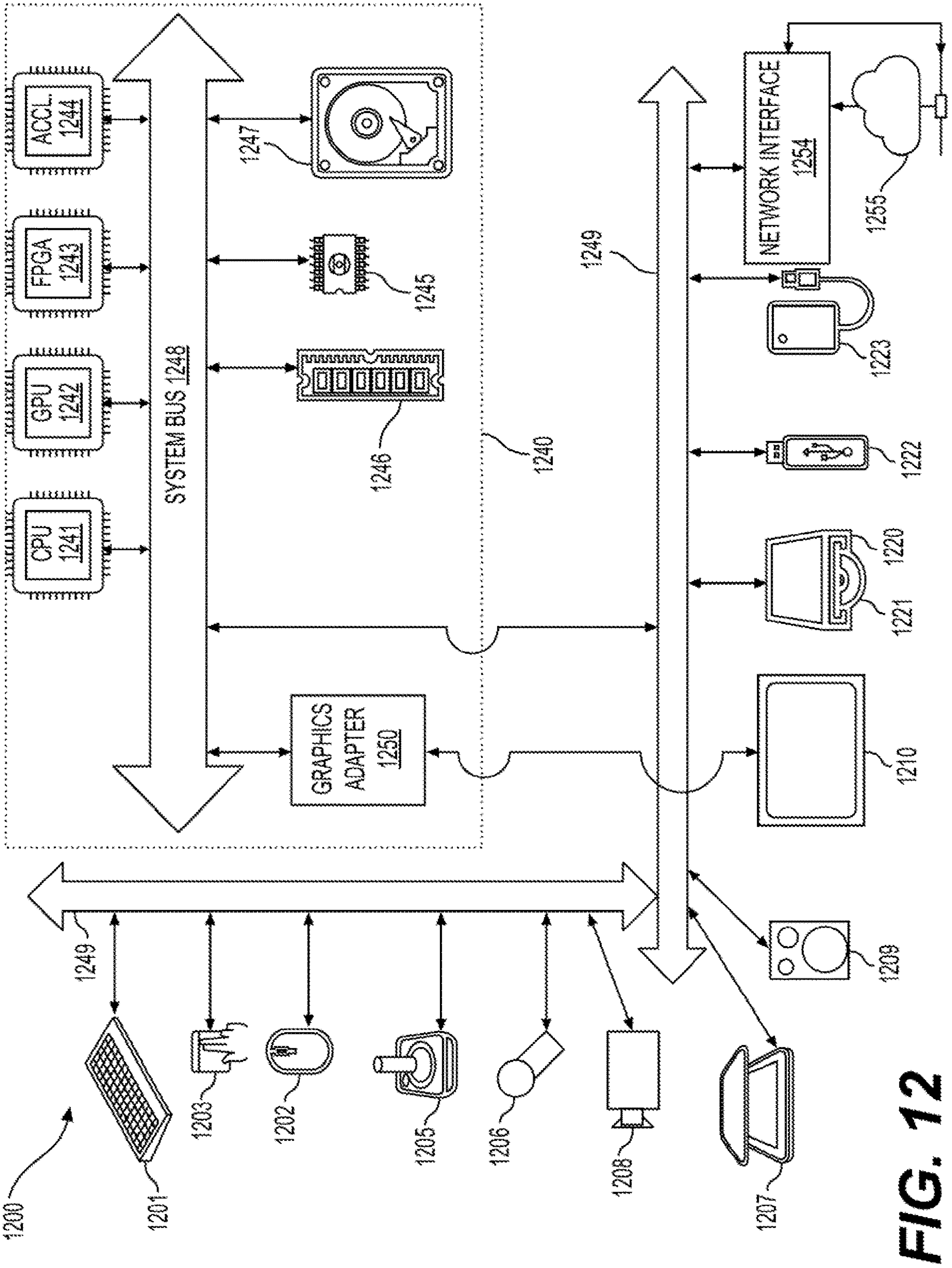
FIG. 12 is a schematic illustration of a computer system in accordance with an embodiment.

The components shown in FIG. 12 for computer system (1200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1200).

Computer system (1200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1201), mouse (1202), trackpad (1203), touch screen (1210), data-glove (not shown), joystick (1205), microphone (1206), scanner (1207), camera (1208).

Computer system (1200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1210), data-glove (not shown), or joystick (1205), but there can also be tactile feedback devices that do not serve as input devices), audio output devices (such as: speakers (1209), headphones (not depicted)), visual output devices (such as screens (1210) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1200) can also include human accessible storage devices and their associated media such as optical media including CD/DVD ROM/RW (1220) with CD/DVD or the like media (1221), thumb-drive (1222), removable hard drive or solid state drive (1223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1200) can also include an interface (1254) to one or more communication networks (1255). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1249) (such as, for example USB ports of the computer system (1200)); others are commonly integrated into the core of the computer system (1200) by attachment to a system bus as described below (for example Ethernet interface into a PC computer system or cellular network interface into a smartphone computer system). Using any of these networks, computer system (1200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1240) of the computer system (1200).

The core (1240) can include one or more Central Processing Units (CPU) (1241), Graphics Processing Units (GPU) (1242), specialized programmable processing units in the form of Field Programmable Gate Areas (FPGA) (1243), hardware accelerators for certain tasks (1244), graphics adapters (1250), and so forth. These devices, along with Read-only memory (ROM) (1245), Random-access memory (1246), internal mass storage such as internal non-user accessible hard drives, SSDs, and the like (1247), may be connected through a system bus (1248). In some computer systems, the system bus (1248) can be accessible in the form of one or more physical plugs to enable extensions by additional CPUs, GPU, and the like. The peripheral devices can be attached either directly to the core's system bus (1248), or through a peripheral bus (1249). In an example, the screen (1210) can be connected to the graphics adapter (1250). Architectures for a peripheral bus include PCI, USB, and the like.

CPUs (1241), GPUs (1242), FPGAs (1243), and accelerators (1244) can execute certain instructions that, in combination, can make up the aforementioned computer code. That computer code can be stored in ROM (1245) or RAM (1246). Transitional data can be also be stored in RAM (1246), whereas permanent data can be stored for example, in the internal mass storage (1247). Fast storage and retrieve to any of the memory devices can be enabled through the use of cache memory, that can be closely associated with one or more CPU (1241), GPU (1242), mass storage (1247), ROM (1245), RAM (1246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1200), and specifically the core (1240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1240) that are of non-transitory nature, such as core-internal mass storage (1247) or ROM (1245). The software implementing various embodiments of the present disclosure can be stored in such devices and executed by core (1240). A computer-readable medium can include one or more memory devices or chips, according to particular needs. The software can cause the core (1240) and specifically the processors therein (including CPU, GPU, FPGA, and the like) to execute particular processes or particular parts of particular processes described herein, including defining data structures stored in RAM (1246) and modifying such data structures according to the processes defined by the software. In addition or as an alternative, the computer system can provide functionality as a result of logic hardwired or otherwise embodied in a circuit (for example: accelerator (1244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to Care intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:

receiving a coded video bitstream comprising coded information of a current block in a current picture, the coded information indicating a use of at least two prediction models on different samples in the current block;

obtaining reconstructed samples of a first color component in the current picture;

generating predicted values of first samples of a second color component in the current block according to a first prediction model and a first subset of the reconstructed samples of the first color component;

generating predicted values of second samples of the second color component in the current block according to a second prediction model and a second subset of the reconstructed samples of the first color component, the second prediction model being different from the first prediction model;

determining whether to apply a filter on a current sample of the second color component in the current block based on whether one or more adjacent neighboring samples of the second color component use a different prediction model from the current sample; and reconstructing, when the filter is determined to be applied, the current sample based on a filtering output from the filter with predicted values of the current sample and the one or more adjacent neighboring samples being inputs of the filter.

2. The method of claim 1, wherein the coded information indicates a use of multi-model cross component prediction, and the method includes:

generating, for a first sample in the first samples, a first predicted value of the second color component based on a first reference value from the first subset of the reconstructed samples of the first color component according to the first prediction model; and generating, for a second sample in the second samples, a second predicted value of the second color component based on a second reference value from the second subset of the reconstructed samples of the first color component according to the second prediction model.

3. The method of claim 1, wherein the coded information indicates a use of a plurality of local illumination compensation (LIC) models, and the method includes:

applying a first LIC model on the first subset of the reconstructed samples corresponding to a first class of samples to generate the predicted values of the first samples; and applying a second LIC model on the second subset of the reconstructed samples corresponding to a second class of samples to generate the predicted values of the second samples.

4. The method of claim 1, wherein each of the at least two prediction models is a linear model that defines a linear combination of a plurality of terms.

5. The method of claim 1, wherein the filter comprises at least a first term of the current sample and at least a second term of an adjacent neighboring sample.

6. The method of claim 1, wherein the determining whether to apply the filter further comprises:

determining to apply the filter when an adjacent neighboring sample of the current sample uses a different prediction model from the current sample.

7. The method of claim 1, wherein the determining whether to apply the filter further comprises:

determining to apply the filter when each adjacent neighboring sample of the current sample use a different prediction model from the current sample.

8. The method of claim 1, wherein the one or more adjacent neighboring samples of the current sample are in the current block.

9. The method of claim 1, further comprising:

decoding a flag that indicates whether to apply the filter in the current block when the coded information indicates the use of at least two prediction models in the current block.

10. The method of claim 1, further comprising:

determining whether to apply the filter in the current block based on a ratio of sample numbers for different prediction models.

11. The method of claim 10, further comprising:

calculating the ratio as a first sample number of the first samples to a second sample number of the second samples; or calculating the ratio as a sample number for one of the first prediction model or the second prediction model to a total number of samples in the current block.

12. The method of claim 10, further comprising:

determining whether the ratio satisfies a requirement based on a comparison of the ratio to a threshold; and determining to apply the filter in the current block when the ratio satisfies the requirement.

13. The method of claim 12, wherein the ratio is defined as at least one of a constant value or an inverse of the constant value.

14. The method of claim 13, wherein the constant value is predefined.

15. The method of claim 13, wherein the constant value is determined from a high level syntax.

16. A method of video encoding, comprising:

encoding reference samples of a first color component in a current picture;

obtaining reconstructed samples of the first color component based on reconstructing the encoded reference samples;

generating predicted values of first samples of a second color component in a current block in the current picture according to a first prediction model and a first subset of the reconstructed samples of the first color component;

generating predicted values of second samples of the second color component in the current block according to a second prediction model and a second subset of the reconstructed samples of the first color component, the second prediction model being different from the first prediction model;

determining whether to apply a filter on a current sample of the second color component in the current block based on whether one or more adjacent neighboring samples of the second color component use a different prediction model from the current sample;

reconstructing, when the filter is determined to be applied, the current sample based on a filtering output from the filter with predicted values of the current sample and the one or more adjacent neighboring samples being inputs of the filter;

including, in a bitstream, coded information indicating a use of at least two prediction models on different samples in the current block; and encoding one or more blocks of the current picture or another picture in the bitstream based on at least the reconstructed current sample.

17. The method of claim 16, further comprising:

generating, for a first sample in the first samples, a first predicted value of the second color component based on a first reference value from the first subset of the reconstructed samples of the first color component according to the first prediction model; and generating, for a second sample in the second samples, a second predicted value of the second color component based on a second reference value from the second subset of the reconstructed samples of the first color component according to the second prediction model, wherein the coded information indicates a use of multi-model cross component prediction.

18. The method of claim 16, further comprising:

applying a first local illumination compensation (LIC) model on the first subset of the reconstructed samples corresponding to a first class of samples to generate the predicted values of the first samples; and applying a second LIC model on the second subset of the reconstructed samples corresponding to a second class of samples to generate the predicted values of the second samples, wherein the coded information indicates a use of a plurality of LIC models.

19. The method of claim 16, further comprising:

determining whether to apply the filter in the current block based on a ratio of sample numbers for different prediction models.

20. A non-transitory computer-readable storage medium storing instructions which when executed by a processor cause the processor to perform a method of encoding a bitstream comprising:

encoding reference samples of a first color component in a current picture;

obtaining reconstructed samples of the first color component based on reconstructing the encoded reference samples;

generating predicted values of first samples of a second color component in a current block in the current picture according to a first prediction model and a first subset of the reconstructed samples of the first color component;

generating predicted values of second samples of the second color component in the current block according to a second prediction model and a second subset of the reconstructed samples of the first color component, the second prediction model being different from the first prediction model;

determining whether to apply a filter on a current sample of the second color component in the current block based on whether one or more adjacent neighboring samples of the second color component use a different prediction model from the current sample;

reconstructing, when the filter is determined to be applied, the current sample based on a filtering output from the filter with predicted values of the current sample and the one or more adjacent neighboring samples being inputs of the filter;

encoding, in the bitstream, coded information indicating a use of at least two prediction models on different samples in the current block;

encoding one or more blocks of the current picture or another picture in the bitstream based on at least the reconstructed current sample; and transmitting the encoded bitstream.

* * * * *